(12) United States Patent
Nelson

(10) Patent No.: US 6,926,263 B1
(45) Date of Patent: Aug. 9, 2005

(54) HIGH CENTER OF GRAVITY STABLE PNEUMATIC ISOLATOR

(75) Inventor: Peter G. Nelson, Newburyport, MA (US)

(73) Assignee: Technical Manufacturing Corporation, Peabody, MA (US)

( * ) Notice: Subject to any disclaimer, the term of this patent is extended or adjusted under 35 U.S.C. 154(b) by 0 days.

(21) Appl. No.: 10/420,056

(22) Filed: Apr. 18, 2003

Related U.S. Application Data

(63) Continuation of application No. 09/836,816, filed on Apr. 17, 2001, now abandoned.

(51) Int. Cl.[7] .................................................. F16F 9/04
(52) U.S. Cl. .................................... 267/64.23; 267/121
(58) Field of Search ........................... 267/64.23, 64.19, 267/64.27

(56) References Cited

U.S. PATENT DOCUMENTS

| | | | |
|---|---|---|---|
| 2,241,409 A | 5/1941 | Mason ........................ 255/16 |
| 3,598,353 A | 8/1971 | DeGrey ....................... 248/358 |
| 3,627,246 A | 12/1971 | Widding et al. ......... 248/188.8 |
| 3,784,146 A | 1/1974 | Matthews .................. 248/358 |
| 3,917,201 A | 11/1975 | Roll ............................ 248/20 |
| 4,354,397 A | 10/1982 | Fix ............................. 74/108 |
| 4,360,184 A | 11/1982 | Reid, III .................... 248/573 |
| 4,496,130 A | 1/1985 | Toyama ...................... 248/585 |
| 4,941,640 A | 7/1990 | Nakamura et al. .......... 248/562 |
| 5,026,010 A | 6/1991 | Camarota ................ 248/188.1 |
| 5,042,784 A | 8/1991 | Murai et al. ................ 267/136 |
| 5,067,684 A | 11/1991 | Garnjost ..................... 248/550 |
| 5,071,108 A | 12/1991 | Houghton, Jr. ............. 267/136 |
| 5,141,201 A | 8/1992 | Mizuno et al. ............. 248/550 |
| 5,285,995 A | 2/1994 | Gonzalez et al. ........... 248/550 |
| 5,379,980 A | 1/1995 | Houghton, Jr. et al. ..... 248/550 |
| 5,779,010 A | 7/1998 | Nelson ....................... 188/378 |
| 5,918,862 A | 7/1999 | Nelson .................... 267/64.23 |
| 5,939,639 A | 8/1999 | Lethbridge .................. 73/724 |
| 5,996,960 A | 12/1999 | Krajec ......................... 248/638 |
| 6,000,671 A | 12/1999 | Helms ......................... 248/563 |
| 6,036,162 A | 3/2000 | Hayashi ...................... 248/550 |
| 6,123,312 A | 9/2000 | Dai ............................. 248/550 |
| 6,126,137 A | 10/2000 | Helms ......................... 248/563 |
| 6,170,622 B1 | 1/2001 | Wakui et al. ............... 188/378 |
| 6,193,206 B1 | 2/2001 | Yasuda et al. .............. 248/550 |
| 6,202,492 B1 | 3/2001 | Ohsaki ........................ 73/662 |

*Primary Examiner*—Robert A. Siconolfi
(74) *Attorney, Agent, or Firm*—Greenberg Traurig, LLP; Brian A. Carpenter

(57) ABSTRACT

A pneumatic isolator for isolating payloads from vibrations consisting of a vertical isolator suspended from pendulum wires. The top load surface of the isolator strongly resists tilt, thus improving payload stability.

21 Claims, 3 Drawing Sheets

HIGH CENTER OF GRAVITY STABLE PNEUMATIC ISOLATOR

This application is a continuation of application Ser. No. 09/836,816, filed Apr. 17, 2001, now abandoned.

BACKGROUND OF THE INVENTION

1. Field of Invention

An improved pneumatic vibration isolation system which has additional stability for high center-of-gravity payloads.

2. Description of the Relevant Art

In many sensitive instrumentation applications it is desirable to isolate a payload from ground vibrations. It is well known to integrate a pneumatic air spring with a simple pendulum to isolate from vertical and horizontal ground noise respectively. Air springs have an advantage over conventional springs in that they can maintain a payload at a given operating height independent of changes in the payload's weight. The vibration isolation characteristic of such isolators is also largely independent of the payload's weight. Payloads are generally supported by at least three isolators, with four being the most common number. More isolators can be used to support additional weight, with little change on the isolation system's performance. The height of the payload is maintained in such systems by a mechanical or electronic valving system which monitors the payload's height and adjusts the amount of air in each isolator. In this way the isolators can return to the same height with changing or shifting payload weights. Pneumatic isolators are typically of a two-chamber design, where motion of the payload forces air to move through a small orifice or flow restrictor. The resistance to this flow provides vertical damping in the isolators.

Payloads supported below their center-of-gravity (c.g.) are inherently unstable. As the payload tilts, its center-of-mass moves horizontally in a way that wants to further increase tilt. Opposing this is the vertical stiffness of the pneumatic isolators which try to restore the payload to level. The balance of these two forces determines whether the system is gravitationally stable or not. Stability of a system increases with the square of the isolator separation, and decreases linearly with the payload's center-of-mass height.

Although system tilt stability can be improved by simply increasing the separation between the isolators, many instruments which use pneumatic isolators are forced to have as small a footprint as possible. This is particularly true for instruments designed for the semiconductor manufacturing industry, where 'cleanroom' floor space can be extremely costly.

There are two basic configurations for integrating vertical pneumatic isolators with pendulums for horizontal isolation. In one geometry, the pendulum is between the pneumatic isolator and the payload. In these, floor vibration is transmitted through an air spring, then the pendulum. These are called 'spring-first' isolators. If the pendulum is between the floor and the air spring, then it is called a 'pendulum first' isolator.

The disadvantage of spring-first systems when used to support high c.g. payloads is two fold. First, the effective support point for a spring-first isolator is the bottom of the pendulum. This increases the effective c.g. height by the length of the pendulum wires, decreasing the tilt stability. This type of isolator also produces tilt when the payload is translated in a horizontal direction. As the payload moves sideways, the burden of supporting the payload is shifted from the isolators on one side of the payload to the other. This causes the isolators more heavily burdened to depress, and those with a lightened load to extend. This generates a tilt from a pure horizontal displacement (known as horizontal-to-tilt coupling). This type of coupling also tends to decrease system stability.

In pendulum first isolators, the vertical pneumatic isolators move with the payload when displaced horizontally, and thus the weight burden on the isolators is unchanged, and this contribution to tilt instability is eliminated.

BRIEF SUMMARY OF THE INVENTION

The present invention improves the tilt stability of a payload by using pneumatic isolators which resist tilting of the payload. The isolator is comprised of a vertical pneumatic isolator assembly suspended by wires. Usually three wires are used and they are grounded.

Broadly, the isolator assembly comprises a two-chamber pressure vessel, with the chambers being connected by a flow restricting orifice. One of the chambers is sealed with a piston secured to the pressure vessel by a flexible diaphragm. Pressurizing the chamber produces an upward force on the piston which is used to lift and isolate a payload. In normal isolator assemblies, the payload is directly coupled to the piston through a 'top plate', and is free to tilt (gimbal), as the rolling flexible diaphragm used to seal the piston does not constrain this motion. In the present invention, means are provided for strongly resisting the tilting of this top plate while maintaining suitably soft characteristics for vertical and horizontal motions.

When the payload tilts, the top plate must also tilt. Thus, increasing the tilt stiffness of the isolator top plate increases the tilt stiffness for the payload as a whole and reduces tilt. This increase in tilt stiffness can be significant (up to several times stiffer) when compared with an isolation system's normal tilt stiffness (the tilt restoring force generated by the vertical displacements in the system's isolators). Although this increased tilt stiffness degrades the tilt vibration transfer function for a system, tilt noise is known to be small in most environments. The present invention leaves the vertical and horizontal isolator stiffness' virtually unchanged, and thus preserves the isolator's vertical and horizontal vibration transfer function performance.

The isolator top plates cannot be made arbitrarily stiff to tilt. As the isolators are inflated, it is inevitable that one edge of the payload is lifted before the other. This 'power-up' tilt can involve extremely high torques on the isolator top plates. The isolators must be able to tolerate power-up tilting without sustaining damage.

Broadly the invention comprises a pneumatic isolator which vertically supports a payload. A minimum of three isolators are used to support a payload. There are at least three wires which are grounded at their tops (fastened to earth via a supporting structure) and connected to a pneumatic isolator assembly at their lower ends. The preferred number of wires is three. The wires prevent the isolator assembly from tilting with horizontal displacements of the payload relative to the earth, while providing a soft suspension to provide horizontal vibration isolation.

The pneumatic isolator assembly comprises a piston and top plate which supports the payload. The piston is flexibly secured and sealed to a pneumatic chamber by a flexible (rolling rubber) diaphragm. A second pressure chamber is connected to this chamber through a small orifice. As the payload moves in the vertical direction, air is forced to flow between the two chambers through the orifice. This provides a means for damping vertical oscillations of the payload.

Fluidic damping (a bob fastened to the piston which moves through a viscous fluid) can also be used to damp motions. Means for reducing tilt by increasing the tilt stiffness of the isolator's supporting top plate are provided in various embodiments.

In a preferred embodiment, a spring-metal flexure is used to guide the bottom of a rod depending from the piston. Such flexures are well known and have many different geometries (including 'spiral arm' designs). They are designed to have very small axial stiffness and friction, but very high radial stiffness and can easily accommodate tilting of the rod depending from the piston. If a single flexure is used, the rod is prevented from tilting by the flexure at the bottom, and the rolling rubber diaphragm at the top (which also has a large radial stiffness).

In an alternative embodiment, an isolator can use two flexures, providing a stronger resistance to tilt than one flexure.

In another alternate embodiment, a rod extends downwardly from the piston and is received in a linear bearing. The bearing is chosen to have extremely low friction, even when under a side-load. In addition, the bearing must be mounted in a bushing which allows the rod to tilt during 'power-up' tilting. The radial stiffness of a rolling rubber diaphragm is used to help constrain tilting of the top plate.

In still another alternative embodiment, a rod depending from the load supporting disk can be placed outside of the pressurized volume. This rod can couple to one or more spring flexures or linear bearings.

DESCRIPTION OF THE PREFERRED EMBODIMENT(S)

Figure 1:
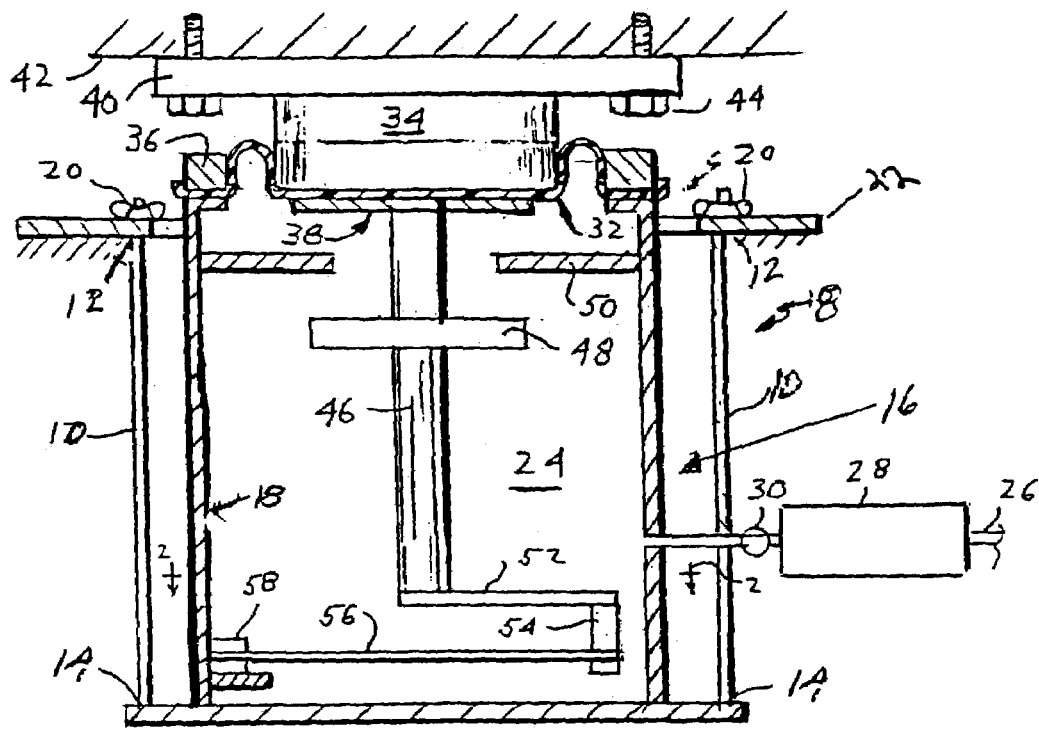
FIG. 1 is a front sectional view of a preferred embodiment of the invention.

Referring to FIG. 1, an isolator is shown generally at 8 and comprises three or more wires 10 (only two shown) each having an upper end 12 and a lower end 14. The lower ends, 14 of the wires 10 are flexibly secured to and support a vertical isolator assembly 16 which is comprised of a pressure vessel 18 and a piston 34 flexibly secured to the top of the vessel 18. The upper ends 12 of the wires 10 are flexibly secured to a structure 22 supported by earth. Adjusting screws 20 allow the length of the wires 10 to be adjusted to bring a top plate 40 parallel with the bottom surface of a payload 42. Inside of the vessel 18 is a pressurized volume of air 24. The pressure is controlled by a valving system (not shown) connected at 26. Air from the valving system flows through a second pressure vessel schematically shown at 28 (not to scale), and a flow restricting orifice 30 which together provide vertical damping in the isolator. The air volume of 28 typically has 2–5 times the volume of 24.

The top of the vessel 18 is sealed by a fabric-reinforced rubber diaphragm 32 which supports the piston 34. It is secured to the piston 34 by a clamping disk 38, and to the vessel 18 by a clamping ring 36. The piston 34 is secured to the top plate 40 which is fastened to the payload 42 to be isolated, by two or more bolts 44. When the air volume 24 is pressurized, the payload 42 is lifted, and the isolator 8 functions as a pneumatic vibration isolator.

A cross member 48 is rigidly secured to a rod 46 which depends from the piston 34. A keyway 50 is rigidly connected to the wall of the pressure vessel 18 to prevent the piston 34 from overextending in travel preventing possible damage to the isolator 8.

A spring metal flexure 56 is secured at one end to the rod 46 by an arm 52 and a spacer 54 and is secured at the other end to the vessel 18 by a clamp 58. The flexure 56 prevents the bottom of the rod 46 from moving in the horizontal plane. Combined with the radial stiffness of the diaphragm 32, the payload 42 is presented with a high resistance to tilt.

Figure 2:
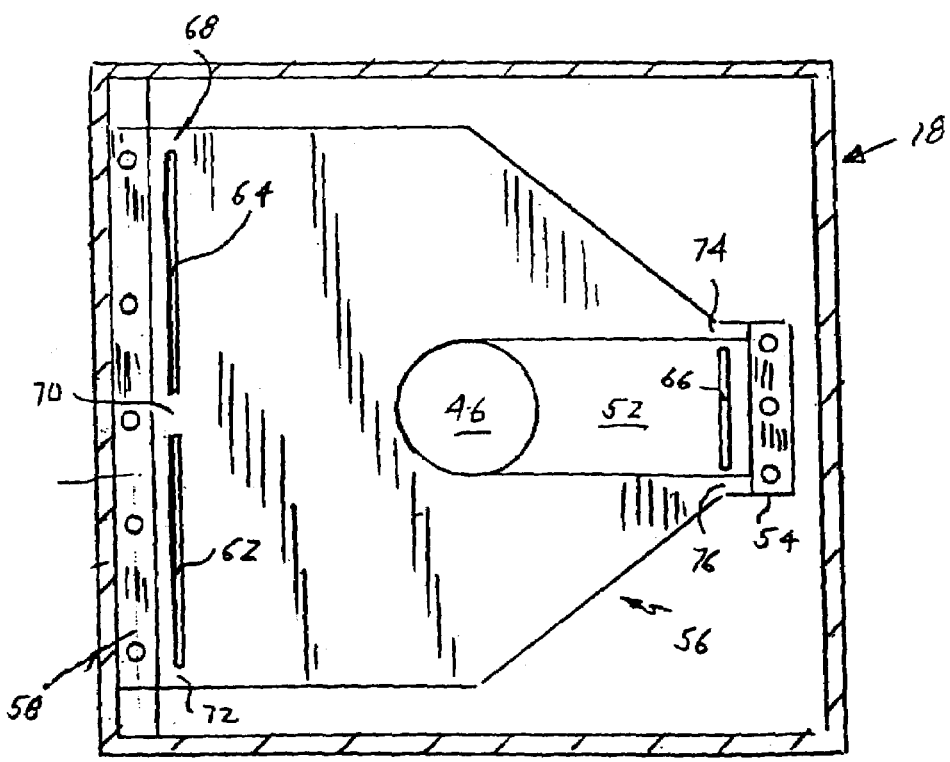
FIG. 2 is a top view of a spring metal flexure bearing taken along lines 2—2 of FIG. 1.

FIG. 2 shows a top view of the spring metal flexure 56 inside the pressure vessel 18. The flexure 56 is secured at one end to the arm 52, which arm 52 is fastened to the rod 46 which depends from the piston 34. At the other end, the flexure 56 is fastened to the wall of the vessel 18 by the clamp 58. Narrow cuts in the flexure 56 at 62, 64 and 66 force the bending stresses to be focused at points 68, 70, 72, 74 and 76. This effectively forms two hinges, one at a line between points 74 and 76, and the other along a line between points 68 and 72. This reduces the bending of the central area of flexure 56 and thus prevents the flexure 56 from buckling under in-plane stress.

Figure 3:
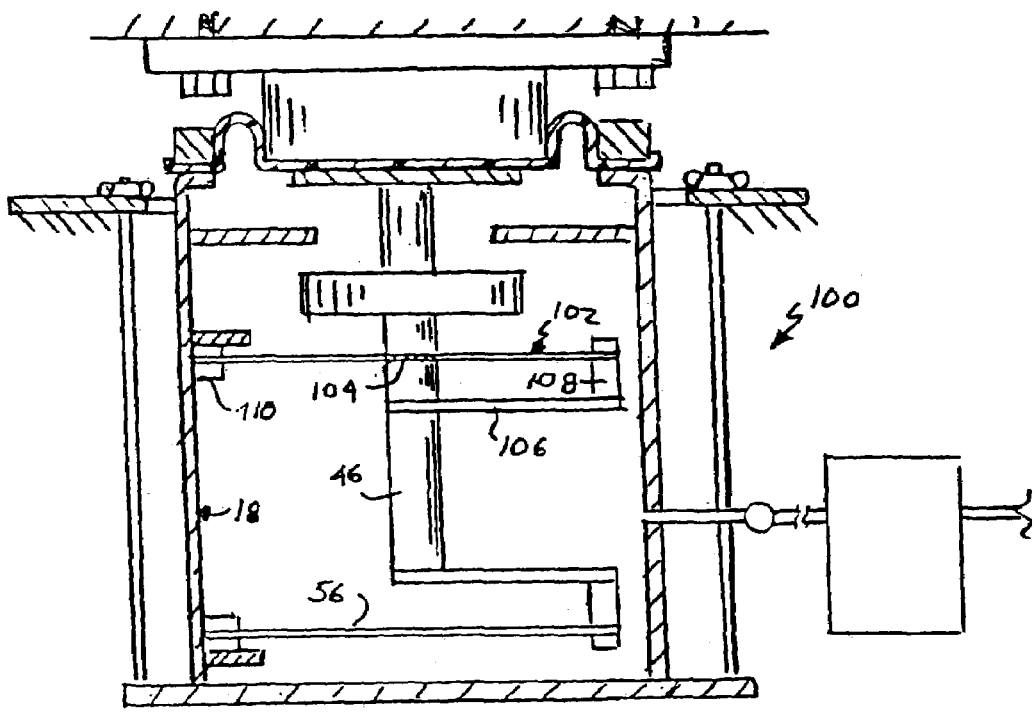
FIG. 3 is a front sectional view of an alternative embodiment of the invention.

Referring to FIG. 3, an alternative embodiment of the invention is shown, wherein an isolator 100, similar to the isolator 8 with the same numbers referring to the same components, has two flexures 56 and 102.

The flexure 102 is secured to an arm 106 by a spacer 108. The arm 106 is rigidly secured to the rod 46. The flexure 102 has a central aperture 104 through which the rod 46 passes without interference. The other end of the flexure 102 is secured to the wall of the pressure vessel 18 by a clamp 110. The embodiment provides stronger resistance to the tilt than the embodiment of FIG. 1.

Figure 4:
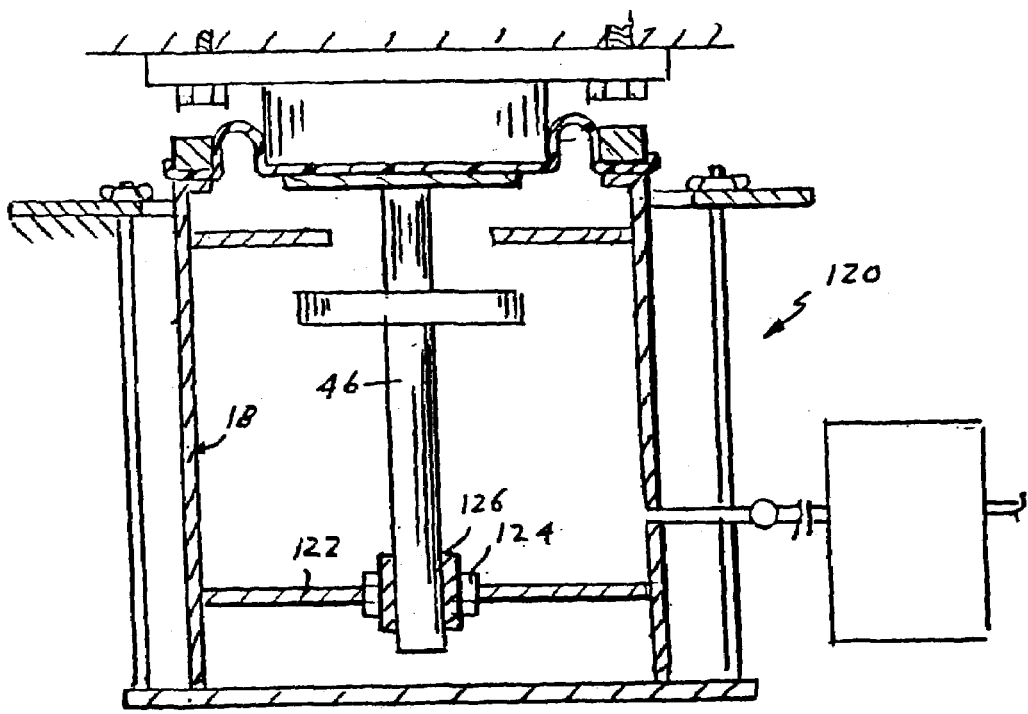
FIG. 4 is a front sectional view of another alternative embodiment of the invention.

Referring to FIG. 4, another alternative embodiment of the invention is shown wherein an isolator 120 similar to the isolator of FIGS. 1 and 2, is shown with the same numbers referring to the same components. In this embodiment, a linear bearing 126 is used to control tilt. In the lower portion of the vessel 18 is a plate 122. Secured in the plate 122 is a rubber bushing 124. Secured in the bushing 124 is the linear bearing 126. The rod 46 is slideably received in the bearing 126.

Figure 5:
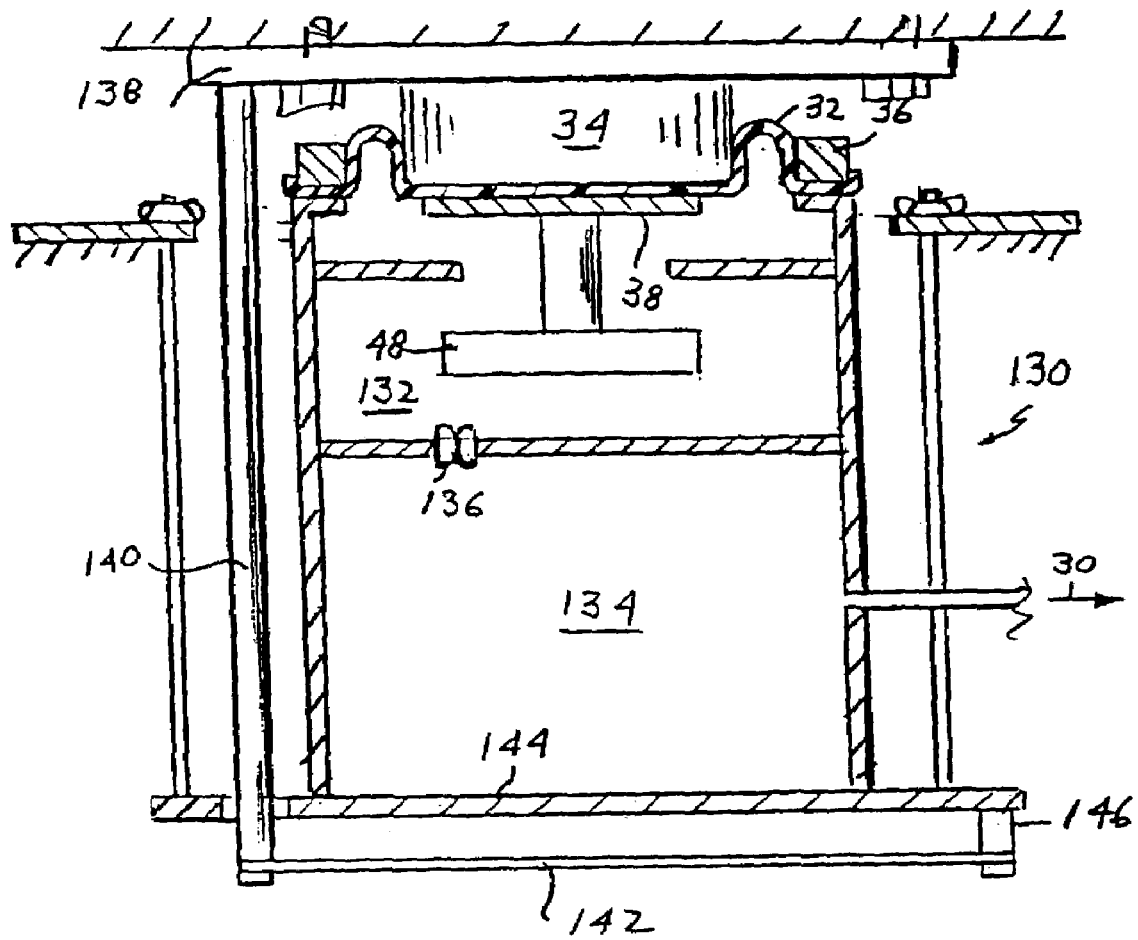
FIG. 5 is a front sectional view of still another alternative embodiment of the invention.

Referring to FIG. 5, another alternative embodiment is shown wherein an isolator 130 comprises a first pneumatic chamber 132 and a second pneumatic chamber 134 connected by an orifice 136. A load plate 138 includes a depending rod 140. The rod 140 at its lower end is secured to a flexure 142. The isolator 130 has a bottom plate 144. The flexure plate 142 is secured to the bottom plate 144 by a clamp 146.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention what I now claim is:

1. A pneumatic isolator for supporting a payload which comprises:

a pneumatic isolator assembly having a pressure vessel defining a chamber sealed with a piston secured to the pressure vessel by a flexible diaphragm, the pneumatic isolator assembly having a longitudinal axis, the pneumatic isolator assembly having a load plate for coupling the payload to the piston;

means for pressurizing the isolator assembly to form a pressurized air volume;

means for suspending the isolator assembly, said means having upper ends which are grounded and lower ends which flexibly suspend the isolator assembly; and means rigidly secured to the load plate for resisting tilt of the load plate with reference to the longitudinal axis of the isolator assembly.

2. The isolator of claim 1 wherein the means for resisting tilt comprises:

an elongated member depending from and rigidly secured to the load plate; and means for restricting the motion of the lower end of the member in the horizontal plane.

3. The isolator of claim 1 wherein the means for resisting tilt of the load plate comprises:

a rod depending from the piston; and a linear bearing secured to the isolator assembly, the rod being received in the linear bearing.

4. The isolator of claim 1 wherein the means for resisting tilt comprises:

an elongated member having an upper and lower end, the upper end of the elongated member depending from and rigidly secured to the piston; and means for restricting the motion of the lower end of the elongated member in the horizontal plane.

5. The isolator of claim 1 wherein the means for restricting motion in the horizontal plane comprises:

a flexure secured to the isolator assembly; and wherein the elongated member comprises a rod rigidly secured to and depending from the load plate and secured at its lower end to the flexure.

6. The isolator of claim 5 wherein the rod is external to the pressurized air volume.

7. A pneumatic isolator for supporting a payload which comprises:

a pneumatic isolator assembly having a pressure vessel defining a chamber sealed with a piston secured to the pressure vessel by a flexible diaphragm, the pneumatic isolator assembly having a longitudinal axis, the pneumatic isolator assembly having a load plate for coupling the payload to the piston;

means for pressurizing the isolator assembly to form a pressurized air volume;

means for suspending the isolator assembly, said means having upper ends which are grounded and lower ends which flexibly suspend the isolator assembly; and means for resisting tilt of the load plate with reference to the longitudinal axis of the isolator assembly;

wherein the means for resisting tilt includes an elongated member depending from and rigidly secured to the load plate, and means for restricting the motion of the lower end of the member in the horizontal plane;

wherein the means for restricting motion in the horizontal plane includes a flexure secured to the isolator assembly; and wherein the elongated member comprises a rod rigidly secured to and depending from the load plate and secured at its lower end to the flexure.

8. The isolator of claim 7 wherein the rod is external to the pressurized air volume.

9. A pneumatic isolator for vertically supporting a payload which comprises:

a pneumatic isolator assembly having a pressure vessel defining a chamber sealed with a piston secured to the pressure vessel by a flexible diaphragm, the pneumatic isolator assembly having a longitudinal axis, the pneumatic isolator assembly having a load plate for coupling the payload to the piston;

means for suspending said isolator assembly, said means having upper ends which are grounded and lower ends which flexibly suspend said isolator assembly; and means for resisting tilt of said load plate with references to said longitudinal axis of said isolator assembly, the means for resisting tilt comprising (a) a rod having an upper and lower end, the upper end of the rod rigidly secured to and depending from said piston; and (b) a first flexure secured to said isolator assembly and secured to the lower end of the rod.

10. The isolator of claim 9 further comprising:

a second flexure intermediate to said first flexure and said piston, said second flexure secured to said isolator assembly; and wherein said rod passes through said second flexure.

11. A pneumatic isolator for supporting a payload which comprises:

a pneumatic isolator assembly having a load plate which vertically supports the payload;

means for suspending said isolator assembly, said means having upper ends for grounding and lower ends which flexibly suspend said isolator assembly;

a spring flexure secured to said isolator assembly; and an elongated member having a lower end, said elongated member depending from and rigidly secured to said load plate and secured at said lower end to said spring flexure.

12. A pneumatic isolator for supporting a payload which comprises:

a pneumatic isolator assembly having a pressure vessel defining a chamber sealed with a piston secured to the pressure vessel by a flexible diaphragm;

means for suspending said isolator assembly, said means having upper ends for grounding and lower ends which flexibly suspend said isolator assembly;

an elongated member depending from and rigidly secured to said piston; and a linear bearing secured to said isolator assembly, the elongated member being slideably received in said linear bearing.

13. A pneumatic isolator for supporting a payload comprising:

a pressure vessel defining an air chamber sealed with a piston secured to said pressure vessel by a flexible rubber diaphragm, a load plate to support the payload, and further including a rod having a first end and a second end, said first end secured to and depending from the piston, said second end connected to said pressure vessel by a spring flexure.

14. The pneumatic isolator according to claim 13, wherein said spring flexure is planar having one or more elongated apertures, thereby preventing said flexure from buckling under in-plane stress.

15. A pneumatic isolator for supporting a payload comprising:

a pressure vessel defining an air chamber sealed with a piston secured to an outside top of said pressure vessel by a flexible rubber diaphragm, a load plate to support the payload, and further including a rod having a first end and a second end, said first end depending from the piston and said second end connected to said pressure vessel by a first spring flexure, said rod further comprising a mid-region, which is intermediate said first end and said second end, and which is connected to said pressure vessel by a second spring flexure.

16. The pneumatic isolator according to claim 15, wherein said first flexure is secured to said second end of said rod by an arm and a spacer, and is secured to said pressure vessel by a clamp.

17. The pneumatic isolator according to claim 15, wherein said first flexure is planar having one or more elongated apertures, thereby preventing said flexure from buckling under in-plane stress.

18. The pneumatic isolator according to claim 15, wherein said second flexure is planar having an opening shaped to receive said rod, wherein said rod passes through the opening in the second flexure.

19. A pneumatic isolator for supporting a payload comprising:

a pressure vessel defining an air chamber having a sidewall and an open top sealed with a piston secured to the pressure vessel by a flexible rubber diaphragm, a load plate to support the payload, and further including a rod having a first end and a second end, said first end depending from and rigidly secured to the piston of said pressure vessel and said second end connected to said pressure vessel by a linear bearing assembly, wherein the rod is slideably received in the linear bearing assembly.

20. A pneumatic isolator for supporting a payload which comprises:

a pneumatic isolator assembly having a pressure vessel defining a chamber sealed with a piston secured to the pressure vessel by a flexible diaphragm, the pneumatic isolator assembly having a longitudinal axis, the pneumatic isolator assembly having a load plate for coupling the payload to the piston;

means for pressurizing the isolator assembly to form a pressurized air volume;

means for suspending the isolator assembly, said means having upper ends which are grounded and lower ends which flexibly suspend the isolator assembly; and means for resisting tilt of the load plate with reference to the longitudinal axis of the isolator assembly;

wherein the means for resisting tilt includes an elongated member having an upper and lower end, the upper end of the elongated member depending from and rigidly secured to the piston; and means for restricting the motion of the lower end of the elongated member in the horizontal plane;

wherein the means for restricting motion in the horizontal plane includes;

a flexure secured to the pressure vessel of the isolator assembly; and wherein the elongated member is secured at its lower end to the flexure.

21. The isolator of claim 20 wherein the flexure is a first flexure, and which comprises:

a second flexure intermediate to the first flexure and the piston, the second flexure secured to the pressure vessel of the isolator assembly; and wherein the elongated member passes through the second flexure.

* * * * *